(12) United States Patent
Li et al.

(10) Patent No.: US 11,331,946 B2
(45) Date of Patent: May 17, 2022

(54) DEFORMATION SENSOR, DEVICE FOR MEASURING LOAD OF WHEEL HUB OF VEHICLE, AND WHEEL ASSEMBLY OF VEHICLE

(71) Applicant: CITIC Dicastal CO., LTD., Hebei (CN)

(72) Inventors: Xi Li, Qinhuangdao (CN); Zhihua Zhu, Qinhuangdao (CN); Shiwen Xu, Qinhuangdao (CN); Yao Dai, Qinhuangdao (CN); Shaobing Huang, Qinhuangdao (CN); Hongwei Sheng, Qinhuangdao (CN); Xiaoqiang Li, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 29 days.

(21) Appl. No.: 16/790,995

(22) Filed: Feb. 14, 2020

(65) Prior Publication Data

US 2021/0101407 A1 Apr. 8, 2021

(30) Foreign Application Priority Data

Oct. 8, 2019 (CN) .......................... 201910951498.2

(51) Int. Cl.
*G01L 1/00* (2006.01)
*B60B 27/00* (2006.01)
*G01L 1/22* (2006.01)

(52) U.S. Cl.
CPC .......... *B60B 27/0068* (2013.01); *G01L 1/225* (2013.01)

(58) Field of Classification Search
CPC ............................ G01L 1/225; B60B 27/0068
See application file for complete search history.

(56) References Cited

U.S. PATENT DOCUMENTS

| | | | |
|---|---|---|---|
| 2002/0092360 A1* | 7/2002 | McDearmon | G01L 5/0019 73/795 |
| 2005/0016296 A1* | 1/2005 | Inoue | B60G 17/019 73/862.044 |
| 2009/0125251 A1* | 5/2009 | Caretta | G01M 17/013 702/42 |
| 2011/0239752 A1* | 10/2011 | Isono | G01L 5/0019 73/146 |

* cited by examiner

*Primary Examiner* — Jamel E Williams
(74) *Attorney, Agent, or Firm* — Cooper Legal Group, LLC

(57) ABSTRACT

The present disclosure discloses a deformation sensor and device for measuring the load of a wheel hub of a vehicle, and an automobile. The deformation sensor includes: a metal lining fixed on the surface of the wheel hub, and a resistance strain gauge fixed on the metal lining. The resistance strain gauge is fixed on the metal lining through a structural adhesive.

8 Claims, 3 Drawing Sheets

DEFORMATION SENSOR, DEVICE FOR MEASURING LOAD OF WHEEL HUB OF VEHICLE, AND WHEEL ASSEMBLY OF VEHICLE

CROSS-REFERENCE TO RELATED APPLICATIONS

The present application claims benefit of Chinese Patent Application No. 201910951498.2, filed on Oct. 8, 2019, the contents of which are hereby incorporated by reference in their entirety.

BACKGROUND

With the development of economy and the advancement of science and technology, intelligent transportation has become an important development direction of human life. How to dynamically acquire load information of vehicles is an important part of the intelligent transportation.

At present, the methods used to acquire the load of vehicles are very limited, basically based on a floor scale. The floor scale has more restrictions. Firstly, the cost of the floor scales, as well as the construction cost, are relatively high. Second, the load of the vehicles cannot be acquired dynamically anytime anywhere.

SUMMARY

The present disclosure relates to a technical field of vehicle manufacturing, and in particular relates to a deformation sensor and device for measuring the load of a wheel hub of a vehicle, and an automobile.

In view of this, the embodiments of the present disclosure are expected to provide a deformation sensor and device for measuring the load of a wheel hub of a vehicle, and an automobile, which can quickly and dynamically acquire the load of the vehicle and are low in cost.

In order to achieve the above objective, according to a first aspect, a embodiment of the present disclosure provides a deformation sensor for measuring the load of a wheel hub of a vehicle. The deformation sensor includes:

a metal lining fixed on the surface of the wheel hub; and a resistance strain gauge fixed on the metal lining.

The resistance strain gauge is fixed on the metal lining through a structural adhesive.

In the above solution, the metal lining is made of a material of aluminum alloy.

In the above solution, the resistance strain gauge is a full-bridge resistance strain gauge.

In the above solution, the structural adhesive is sealing silica gel.

According to a second aspect, the embodiment of the present disclosure provides a device for measuring the load of a wheel hub of a vehicle. The device includes a differential amplification circuit, a processing component and any one of the above deformation sensors. An input end of the differential amplification circuit is connected with the deformation sensor, and an output end of the differential amplification circuit is connected with the processing component.

In the above solution, the processing component is a microcontroller unit (MCU).

In the above solution, the device further includes a communication component for transmitting data processed by the MCU to the outside. The communication component is connected with the MCU.

In the above solution, the communication component includes a radio frequency (RF) element.

According to a third aspect, the embodiment of the present disclosure further provides a wheel assembly of a vehicle. The wheel assembly includes a wheel hub, a tire and the any one of the above devices for measuring the load of a wheel hub of a vehicle. The deformation sensor in the device is mounted at an outer circumferential surface of a rim of the wheel hub. The tire is mounted on the wheel hub, and covers the deformation sensor.

According to a fourth aspect, the embodiment of the present disclosure further provides an automobile. The automobile includes a trip computer, a center console and the above-mentioned wheel assembly. The device for measuring the load of a wheel hub of a vehicle in the wheel assembly is connected with the trip computer, and is connected with the center console.

According to the deformation sensor, device for measuring the load of the wheel hub of the vehicle, and the automobile of the embodiments of the present disclosure, the metal lining fixed on the surface of the wheel hub, and the resistance strain gauge fixed on the metal lining are included. The resistance strain gauge is fixed on the metal lining through the structural adhesive. It can be seen that according to the deformation sensor, device for measuring the load of the wheel hub of the vehicle, and the automobile of the embodiments of the present disclosure, by the arrangement of the deformation sensor including the metal lining and the resistance strain gauge, the load of the vehicle can be quickly and dynamically acquired, and the cost is low.

Other beneficial effects of the embodiments of the present disclosure will be further described in conjunction with specific technical solutions in the specific implementations.

DETAILED DESCRIPTION

An embodiment of the present disclosure provides a deformation sensor for measuring the load of a wheel hub of a vehicle. The deformation sensor includes: a metal lining fixed on the surface of the wheel hub, and a resistance strain gauge fixed on the metal lining. The resistance strain gauge is fixed on the metal lining through a structural adhesive.

According to the deformation sensor for measuring the load of the wheel hub of the vehicle, by the arrangement of the deformation sensor including the metal lining and the resistance strain gauge, the load of the vehicle can be quickly and dynamically acquired, and the cost is low. An embodiment of the present disclosure further provides a device for measuring the load of a wheel hub of a vehicle. The device includes the above-mentioned deformation sensor, a differential amplification circuit and a processing component. An input end of the differential amplification circuit is connected with the deformation sensor, and an output end of the differential amplification circuit is connected with the processing component.

An embodiment of the present disclosure further provides a wheel assembly of a vehicle. The wheel assembly includes a wheel hub, a tire and the above-mentioned device for measuring the load of a wheel hub of a vehicle. The deformation sensor in the device is mounted at an outer circumferential surface of a rim of the wheel hub. The tire is mounted on the wheel hub, and covers the deformation sensor.

An embodiment of the present disclosure further provides an automobile. The automobile includes a trip computer, a center console and the above-mentioned wheel assembly. The device for measuring a load of a wheel hub of a vehicle in the wheel assembly is connected with the trip computer, and is connected with the center console.

The present disclosure is further described in detail below in combination with the drawings and specific embodiments. It should be understood that the specific embodiments described here are merely to illustrate and explain the present disclosure, and not intended to limit the present disclosure.

First Embodiment

Figure 1:
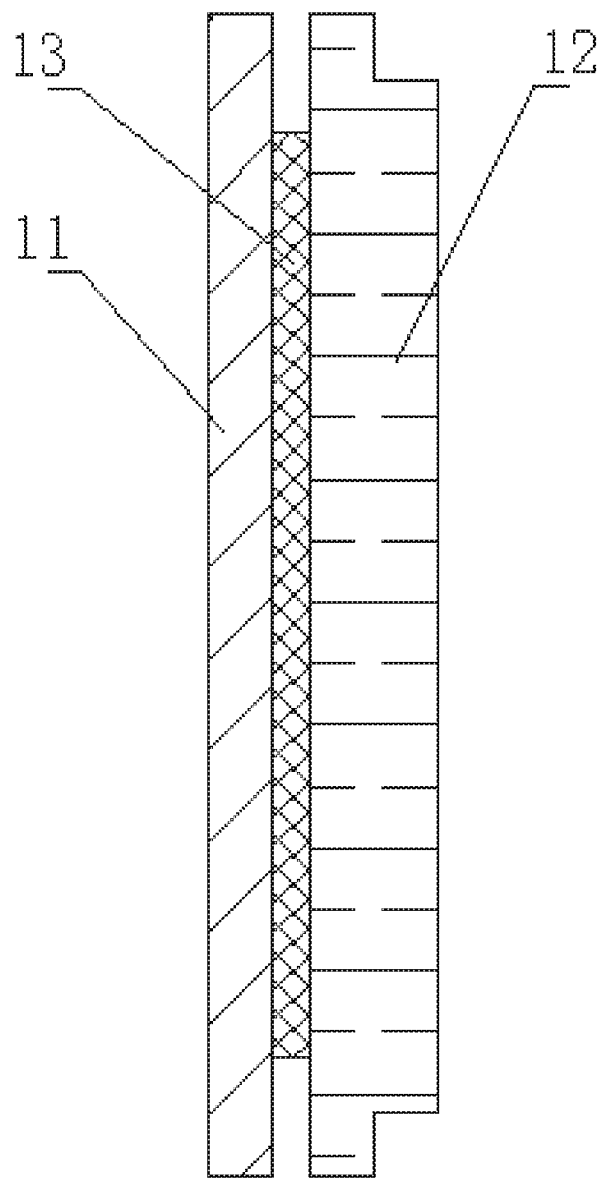
FIG. 1 is a schematic diagram of a deformation sensor for measuring the load of a wheel hub of a vehicle according to an embodiment of the present disclosure.

The present embodiment provides a deformation sensor for measuring the load of a wheel hub of a vehicle. As shown in FIG. 1, the deformation sensor includes: a metal lining 11 and a resistance strain gauge 12. The resistance strain gauge 12 is fixed on the metal lining 11. Specifically, the resistance strain gauge 12 is fixed on the metal lining 11 through a structural adhesive 13. During use, the metal lining 11 is fixed on a surface of the wheel hub.

The principle of the embodiment of the present disclosure is that: the wheel hub of the vehicle would have a slight deformation when loaded. This deformation and the load of the wheel hub have a certain correspondence, so that the load of the wheel hub of the vehicle, i.e., a load of the vehicle, can be calculated according to the detected slight deformation of the wheel hub. The slight deformation of the wheel hub may be detected by the deformation sensor of the present embodiment. That is, the deformation of the wheel hub may drive the metal lining 11 to deform, and the deformation of the metal lining 11 may cause the resistance of the resistance strain gauge 12 to be changed, so that the slight deformation can be detected.

Specifically, during the actual detection, the deformation of the wheel hub of the vehicle and the load of the vehicle may be in a positive-going linear relation.

In the present embodiment, the metal lining 11 is made of a material of aluminum alloy. The material of aluminum alloy is good in elastic deformation capacity, and is close to a material of the wheel hub, so that the deformation of the wheel hub can be better reflected. The aluminum alloy material is mainly applicable to an aluminum alloy wheel hub.

In the present embodiment, the resistance strain gauge 12 is a full-bridge resistance strain gauge 12. In this way, the measurement sensitivity can be double of the measurement sensitivity of a half bridge resistance strain gauge, so that the nonlinearity is improved. It is a preferred method.

In the present embodiment, the structural adhesive 13 is sealing silica gel, so that it is firm in adhesion and corrosion-free. It is a preferred method.

Second Embodiment

Figure 2:
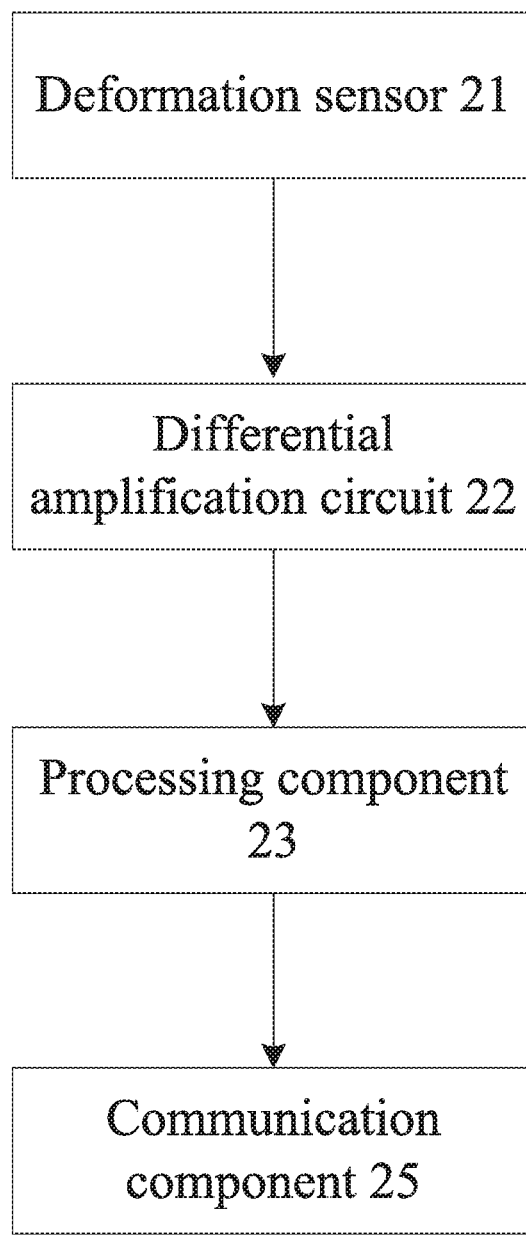
FIG. 2 is a structural schematic diagram of a device for measuring the load of a wheel hub of a vehicle according to an embodiment of the present disclosure.

The present embodiment provides a device for measuring the load of a wheel hub of a vehicle. As shown in FIG. 2, the device includes a deformation sensor 21, a differential amplification circuit 22 and a processing component 23. An input end of the differential amplification circuit 22 is connected with the deformation sensor 21, and an output end of the differential amplification circuit 22 is connected with the processing component 23. The deformation sensor 21 may be the deformation sensor 21 in the first Embodiment.

In the present embodiment, the processing component 23 is a microcontroller unit (MCU). The MCU is also called as a single chip microcomputer or a single chip computer, which is a computer on chip formed by properly reducing the frequency and the specification of a central process unit (CPU) and integrating peripheral interfaces such as a memory, a timer, a universal serial bus (USB), an analog/digital (A/D) converter, a universal asynchronous receiver/transmitter (UART), a programmable logic controller (PLC), a direct memory access (DMA), and even a liquid crystal display (LCD) driving circuit on a single chip, so as to perform different combination control in different application occasions. The control is more convenient, and it is a preferred method.

In the present embodiment, the device further includes a communication component 25 for transmitting data processed by the MCU to the outside. The communication component 25 is connected with the MCU. In this way, the data can be transmitted to a user or a cloud platform more conveniently. It is a preferred method.

In the present embodiment, the communication component 25 includes a radio frequency (RF) element. That is, the frequency range of a wireless signal is between 300 kHz and 300 GHz, and the signal is a widely applied wireless communication signal. The wireless method can simplify the structure, and it is a preferred method.

Specifically, the resistance strain gauge in the present embodiment is a full-bridge strain gauge with the resistance value of 1000 Ohm. The full-bridge strain gauge with the resistance value of 1000 Ohm is more sensitive in measurement, and it is a preferred method.

Figure 3:
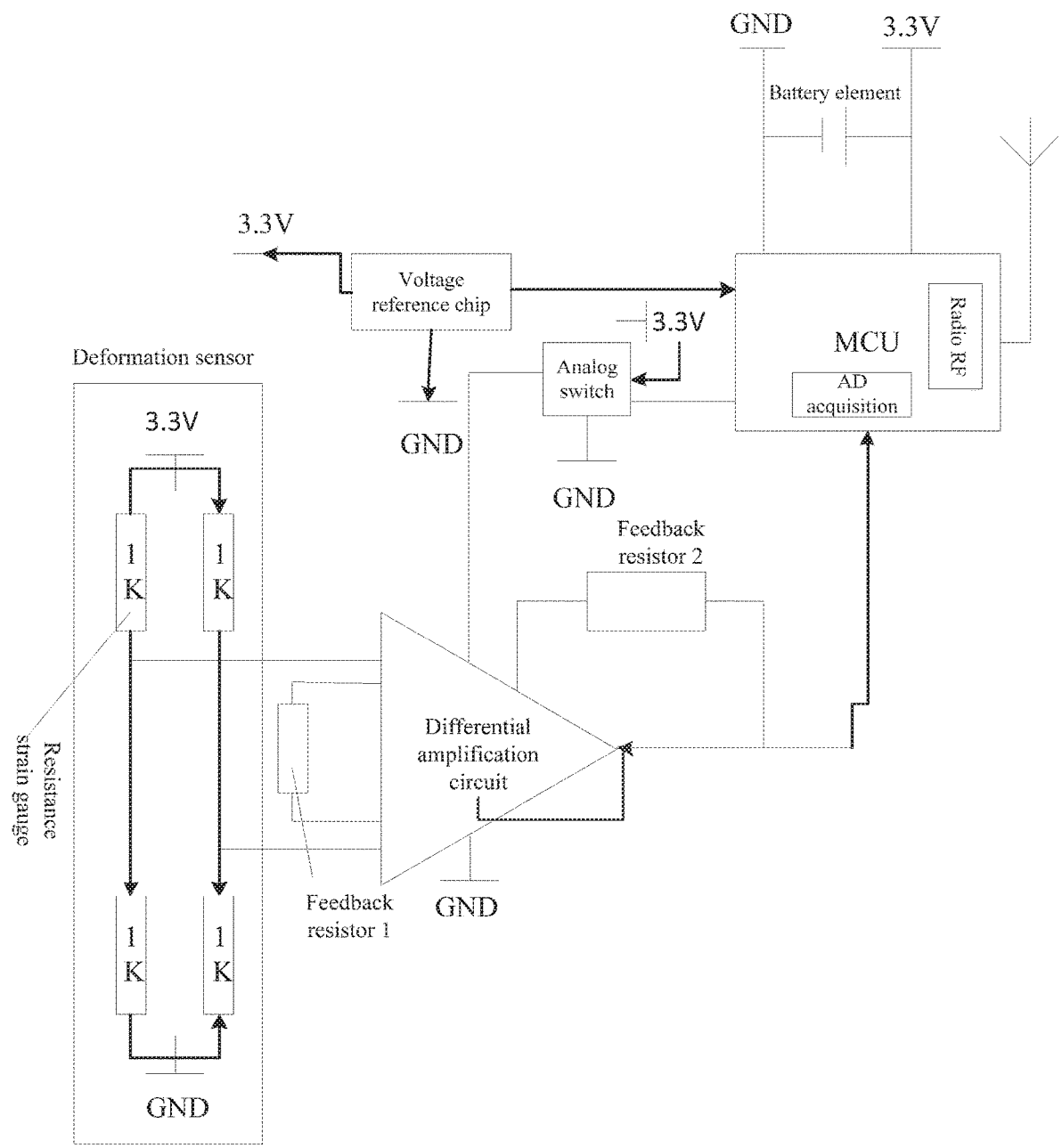
FIG. 3 is a schematic diagram of a circuit principle of a device for measuring the load of a wheel hub of a vehicle according to an embodiment of the present disclosure.

A schematic circuit diagram of the present embodiment may refer to FIG. 3. As shown in FIG. 3, the input end of the deformation sensor in the differential amplification circuit is connected to a +3.3 VDC voltage and a GND ground wire, and the output end of the deformation sensor generates a differential voltage output, so as to acquire data better. The differential amplification circuit 22 uses a chip ADD8553 as an operational amplification circuit, and the voltage of the deformation sensor is amplified by 100 times, and then is output to the processing component 23.

A feedback resistor in the differential amplification circuit is used for amplifying the differential voltage generated by the deformation sensor, and the amplification factor is:

$$\text{amplification factor} = 2*\text{feedback resistor 2}/\text{feedback resistor 1}.$$

Parameters of the present embodiment are selected as follows: the feedback resistance 2 is 392 k, the feedback resistance 1 is 3.92 k, and the amplification factor is 200. This amplification factor is more suitable for the processing of the processing component 23, and it is a preferred method.

The voltage reference chip uses ADR127BUJZ-REEL7 of Analog Devices, Inc (ADI) or a chip having the following same parameter performance:

The voltage reference type: Series-Fixed;
Reference voltage: 1.25 V;
Initial precision: 0.12%;
Temperature coefficient: +/−3 ppm/° C.;

Working temperature: −40° C. to 125° C.;
Automobile quality standard.

This chip is high in precision and stable in performance, and it is a preferred method.

A chip in type of TPS78230QDRVRQ1 from Texas Instruments (TI) are used for an analog switch chip. This chip is high in precision and stable in performance, and it is a preferred method.

The MCU in the present embodiment has 12-bit AD acquisition, and is configured to acquire a conditioned voltage value output by the differential amplification circuit, and a control core of the MCU uses a chip FXTH8715116T1 of NXP Semiconductors. The AD acquisition here is a component for converting an analog signal into a digital signal. This chip is high in precision and stable in performance, and it is a preferred method.

In the MCU in the present embodiment, a low-power-consumption operational amplification chip is AD8553 of ADI or a chip having the following same parameter performance:

Low offset voltage: 20 μV (maximum value);
Low input offset drift: 0.1 μV/° C.;
High CMRR: 140 dB (typical value, G=100);
Nonlinearity: 0.001% (typical value, G=100);
Wide gain range: 0.1 to 10,000;
Single power supply: +1.8 V to 5.5 V;
Rail-to-rail output.

This chip is high in precision and stable in performance, and it is a preferred method.

A chip in type of FXTH8715116T1 from NXP is used for a sampling processing chip. Since it has an acceleration measuring function, this chip can acquire an acceleration value in a z axis or (x, z) axis direction to compensate a deviation of the deformation of the wheel hub at different rotating speeds. In this way, the acquired load of the vehicle is more accurate, and it is a preferred method.

The communication component 25 uses a chip MKW01 Z128CHNX1231 as a receiving chip. The radio AF in FIG. 3 is the communication component 25. This chip is high in precision and stable in performance, and it is a preferred method.

Compared with other measuring devices, the measuring device of the embodiment of the present disclosure is lower in energy loss and more energy-saving.

Third Embodiment

The present embodiment provides a wheel assembly of a vehicle. The wheel assembly includes a device for measuring the load of a wheel hub of a vehicle, a wheel hub and a tire. The deformation sensor in the device is mounted at the outer circumferential surface of a rim of the wheel hub. The tire is mounted on the wheel hub, and covers the deformation sensor. The device for measuring the load of a wheel hub of a vehicle may be the device for measuring the load of a wheel hub of a vehicle in the second Embodiment.

For the convenience of detection here, the deformation sensor is mounted on the wheel hub, and other components in the device for measuring the load of a wheel hub of a vehicle may be mounted on the wheel hub, or may be independent of the wheel hub and mounted on other portions of a vehicle.

Further, the wheel assembly here may only include one portion in the device for measuring the load of a wheel hub of a vehicle. Since the data may be wirelessly transmitted, or may be connected in a non-rigid connection manner such as through a lead wire, the processing unit and the wheel assembly can be separately mounted.

Fourth Embodiment

The present embodiment provides an automobile. The automobile includes a wheel assembly, a trip computer and a center console. The device for measuring the load of a wheel hub of a vehicle in the wheel assembly is connected with the trip computer, and is connected with the center console. The wheel assembly may be the wheel assembly in the third Embodiment.

In order to support the device for measuring the load of a wheel hub of a vehicle in the second Embodiment, the trip computer may be a trip computer of a conventional vehicle, or may be a particularly set trip computer, or may be a computer independent of the trip computer of the vehicle, so that the trip computer here should not be understood by its name, but should be understood as computer equipment that supports the measurement of the load of the wheel hub of the vehicle.

The center console here may receive corresponding information of the load of the wheel hub of the vehicle through a user screen. The information also includes alarm information.

It should be noted that terms "include", "including" or any other variants thereof herein are meant to cover non-exclusive inclusions, so that a process, method, object or device that includes a series of elements not only includes those elements, but also includes other elements which are not definitely listed, or further includes inherent elements of this process, method, object or device. Without more restrictions, elements defined by a sentence "includes a/an . . . " do not exclude that the process, method, object or device that includes the elements still includes other identical elements.

As described in the embodiments of the present disclosure, unless otherwise stated and specified, the term "connect" shall be of a general understanding. For example, it may be an electrical connection, may be a internal connection between two elements, may be a direct connection, and also may be a indirect connection through an intermediate. Those of ordinary skill in the art may understand specific meanings of the above term according to specific situations.

The term "first\second\third" as used in the embodiments of the present disclosure is only to distinguish similar objects, and does not represent a specific order of the objects. It can be understood that specific orders or an order of "first\second\third" may be interchanged where permitted.

It should be understood that "an embodiment" or "some embodiments" mentioned in the whole article of the specification means that specific features, structures or characteristics related to the embodiments are included in at least one embodiment of the present disclosure. Therefore, "in an embodiment" or "in some embodiments" appearing in throughout the whole specification does not necessarily mean the same embodiment. In addition, these specific features, structures or characteristics may be combined in one or more embodiments in any proper manner. It should be understood that in various embodiments of the present disclosure, the serial numbers of the above various processes do not mean the order of execution. The order of execution of the various processes shall be determined by their functions and an internal logic, and shall not constitute any limitations to the implementation processes of the embodiments of the present disclosure. The serial numbers of the embodiments of the present disclosure are only for description, and do not represent the quality advantages and disadvantages of the embodiments.

In the several embodiments provided by the present disclosure, it should be understood that the disclosed equipment and methods may be implemented in other manners. The equipment embodiments described above are merely illustrative. For example, the division of the element or unit is only a logical function division. In actual implementation, there may be another division manner. For example, a plurality of elements or components may be combined, or integrated into another system, or some features may be ignored or not executed. In addition, the mutual coupling or direct coupling or communication connection shown or discussed may be indirect coupling or communication connection through some interfaces, equipment or elements, and may be in electrical, mechanical or other forms.

The above elements described as separate components may or may not be physically separated, and the components displayed as elements may or may not be physical elements. They may be located in one place or distributed to multiple network elements. Some or all of the elements may be selected according to actual needs to achieve the objective of the solution of the present embodiment.

In addition, functional elements in all embodiments of the present disclosure may be integrated into one processing element, or the functional elements may be separately used as independent elements, or two or more functional elements may be integrated into one element. The above integrated elements may be implemented in the form of hardware, or in the form of hardware and software functional elements.

Those of ordinary skill in the art may understand that all or part of the steps of the foregoing method embodiment may be implemented by program instruction related hardware. The foregoing program may be stored in a computer readable storage medium. The steps of the above method embodiment are executed when the program is executed. The foregoing storage medium includes: various types of media that store program codes, such as mobile storage equipment, a Read Only Memory (ROM), a Random Access Memory (RAM), a magnetic disk or an optical disk.

Or, the foregoing integrated element, if implemented in the form of a software functional element and sold or used as a standalone product, may also be stored in a computer readable storage medium. Based on such understanding, the technical solutions of the embodiments of the present disclosure or parts that make contribution to the related art may be embodied in the form of a software product, and the computer software product is stored in a storage medium, including a plurality of instructions configured to cause computer equipment (which may be a personal computer, a server or network equipment) to execute all or part of the methods of the various embodiments of the present disclosure. The foregoing storage media include: various media that may store program codes, such as the mobile storage equipment, the ROM, the RAM, the magnetic disk or the optical disk. Therefore, the embodiments of the present disclosure are not limited to any particular hardware and software combinations.

The above is only the preferred embodiments of the present disclosure, and is not intended to limit the protection scope of the present disclosure. Any modifications, equivalent replacements and improvements that are made within the spirit and principle of the present disclosure shall fall within the protection scope of the present disclosure.

The invention claimed is:

1. A deformation sensor for measuring a load of a wheel hub of a vehicle, comprising:
   a metal lining fixed on a surface of the wheel hub; and
   a resistance strain gauge fixed on the metal lining,
   wherein the resistance strain gauge is fixed on the metal lining through a structural adhesive and the resistance strain gauge is a full-bridge resistance strain gauge.

2. The deformation sensor for measuring the load of the wheel hub of the vehicle according to claim 1, wherein the metal lining is made of a material of aluminum alloy.

3. The deformation sensor for measuring the load of the wheel hub of the vehicle according to claim 2, wherein the structural adhesive is sealing silica gel.

4. A device for measuring a load of a wheel hub of a vehicle, comprising a differential amplification circuit, a processing component and a deformation sensor, wherein
   the deformation sensor comprises a metal lining fixed on a surface of the wheel hub, and a resistance strain gauge fixed on the metal lining, the resistance strain gauge being fixed on the metal lining through a structural adhesive;
   an input end of the differential amplification circuit is connected with the deformation sensor, and an output end of the differential amplification circuit is connected with the processing component.

5. The device for measuring the load of the wheel hub of the vehicle according to claim 4, wherein the processing component is a microcontroller unit (MCU).

6. The device for measuring the load of the wheel hub of the vehicle according to claim 5, wherein the device further comprises a communication component for transmitting data processed by the MCU to outside, and the communication component is connected with the MCU.

7. The device for measuring the load of the wheel hub of the vehicle according to claim 6, wherein the communication component comprises a radio frequency (RF) element.

8. A wheel assembly of a vehicle, comprising a wheel hub, a tire and a device for measuring a load of the wheel hub of the vehicle, wherein
   the device for measuring the load of the wheel hub of the vehicle comprises a differential amplification circuit, a processing component and a deformation sensor, the deformation sensor comprising a metal lining fixed on a surface of the wheel hub, and a resistance strain gauge fixed on the metal lining, the resistance strain gauge being fixed on the metal lining through a structural adhesive;
   an input end of the differential amplification circuit is connected with the deformation sensor, and an output end of the differential amplification circuit is connected with the processing component; and
   the deformation sensor in the device is mounted at an outer circumferential surface of a rim of the wheel hub; and the tire is mounted on the wheel hub, and covers the deformation sensor.

* * * * *